July 2, 1929.  D. PHILLIPS  1,719,723
EDUCATIONAL ASTRONOMICAL DEVICE
Filed Nov. 4, 1927  2 Sheets-Sheet 1

INVENTOR
DAVID PHILLPS
BY
ATTORNEY

July 2, 1929.   D. PHILLIPS   1,719,723
EDUCATIONAL ASTRONOMICAL DEVICE
Filed Nov. 4, 1927   2 Sheets-Sheet 2

INVENTOR
DAVID PHILLIPS
BY
ATTORNEY

Patented July 2, 1929.

1,719,723

UNITED STATES PATENT OFFICE.

DAVID PHILLIPS, OF DAYTONA BEACH, FLORIDA.

EDUCATIONAL ASTRONOMICAL DEVICE.

Application filed November 4, 1927. Serial No. 231,111.

This invention relates to astronomical devices of an exhibitive or educational nature, and is more particularly concerned with such a device arranged to demonstrate, physically and visually, the inter-relation of sun and earth particularly with respect to the seasons of the year.

An object of the invention is the provision of means, including physical embodiments of the sun and earth, by which the movement of the earth in its orbit and relatively to the sun, effects a seasonal axial movement of the earth relatively to the sun.

A further object of the invention is the provision of means for effecting a full movement of the earth about its orbit and a coincident complete revolution of the earth about an axis parallel with that of the orbit, and effective to present the earth in its different seasonal relations to the sun. Advantageously, and as a related feature, the invention presents means cooperating with the earth in its movement through its orbit to trace the ecliptic through the constellations of the zodiac and to indicate the successive constellations entered by the sun.

Figure 1:
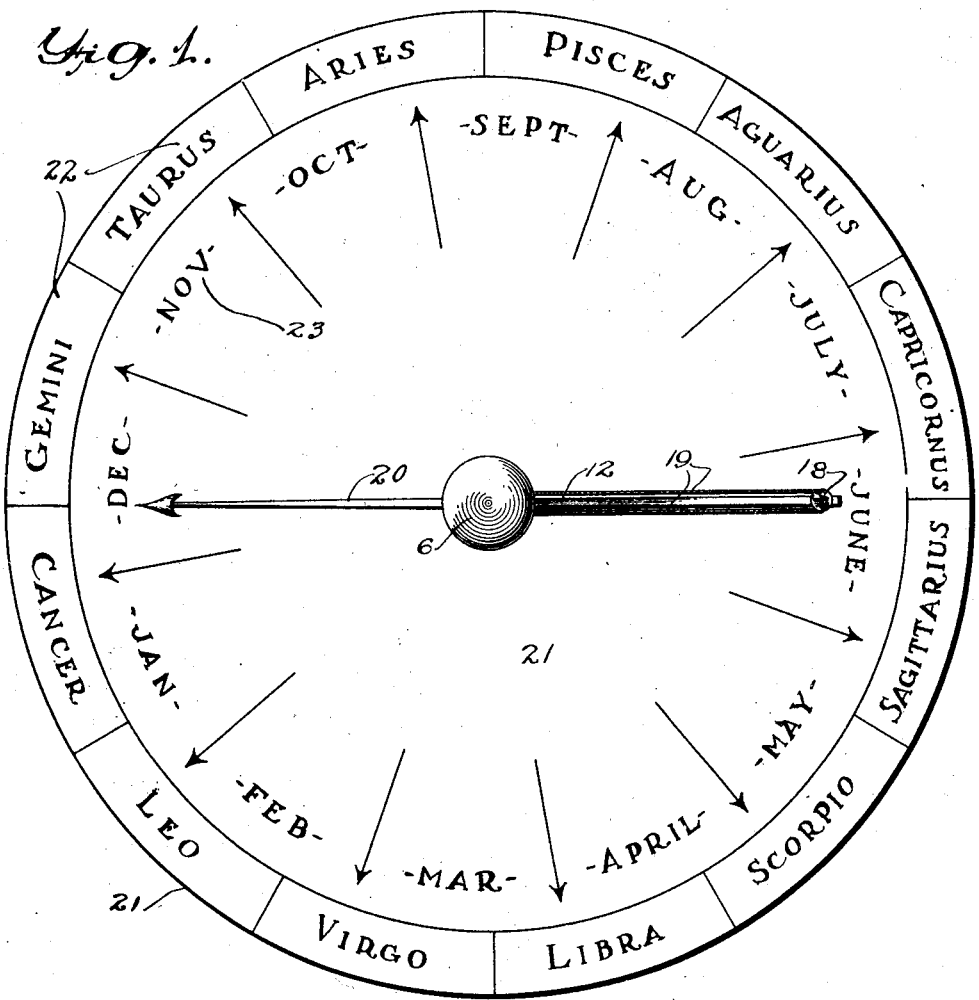
Figure 2:
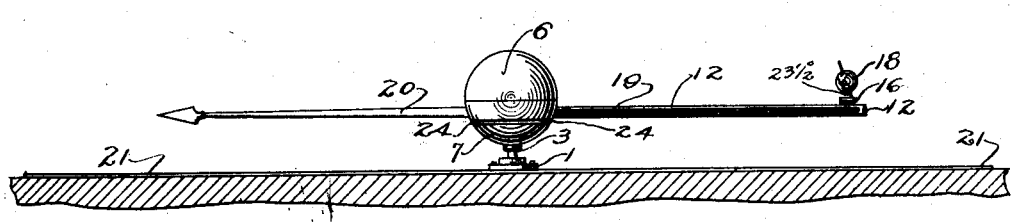
Figure 3:
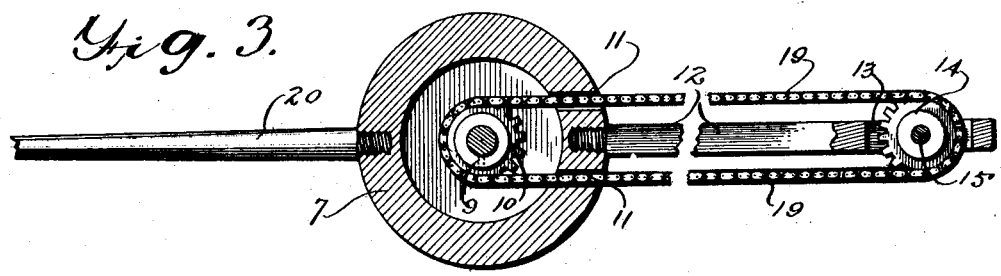
Figure 4:
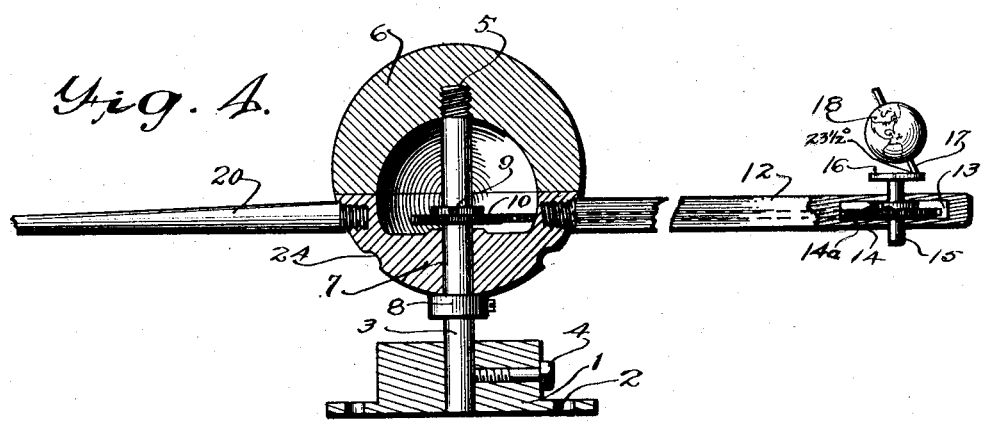
Figure 5:
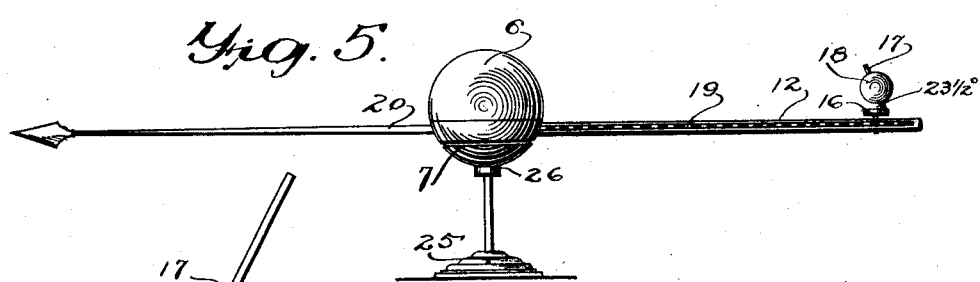
Figure 6:
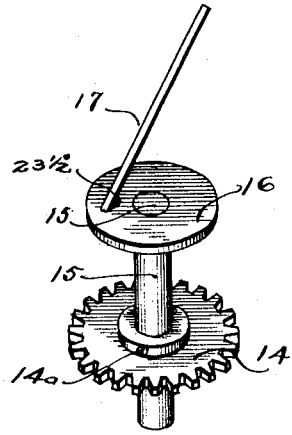

These and other objects and structural advantages and features will be more clearly apparent by reading the following detailed description in conjunction with the accompanying drawings forming part thereof and in which:

Figure 1 is a top plan view of an exhibition table having my device mounted thereon, Figure 2 is a side elevation of the device as shown in Figure 1, Figure 3 is a fragmentary horizontal sectional view on an enlarged scale taken through the rotatable base of the sun body, Figure 4 is a similarly enlarged vertical section through the same parts, Figure 5 is a side elevation of a slightly modified form of the device, Figure 6 is a detail of the earth support and turning gear.

The exhibitive or educational device of the present invention contemplates the use of a sun as a central figure about the axis of which an earth revolves while coincidently turning about a parallel axis in proportion to its bodily movement around the axis of the sun, the path of this bodily movement constituting, in effect, the orbit of the earth relatively to the sun.

In a preferably physical embodiment of the invention, a suitable base 1, preferably of heavy material, is provided which may be flanged as at 2 to receive attaching screws or bolts. From this base uprises what I may term an axis stud 3 suitably fixed to the base as by set screw 4 and having an upper threaded end. The sun body is hollow and is formed of an upper fixed section 6, representing about two-thirds of the sun sphere's bulk, having a threaded socket 5 therein to receive the upper threaded end of the axis stud 3.

The lower sun section 7 is journalled on the stud 3 and supported for rotation by a stop collar 8 set-screwed to the stud 3 therebelow. The circle of separation of the two sections is in a plane parallel with the plane of the orbit of the earth sphere, later to be described. This lower revoluble section of the sun has mounted within its hollow upper portion a toothed gear 10 fixed by its collar 9 rigidly to the stationary axis stud 3. This gear which, as stated, does not turn, serves as an anchor or wrapping post for a chain connecting this gear with an earth-rotating gear of similar size and arrangement.

In order that such a chain may extend through the walls of the sun from its hollow interior, these walls in line with the projected passage of the chain therethrough, are tunnelled as at 11 at spaced points. From a point between the tunnels 11, and arm 12 extends radially from the revoluble sun section 7, being rigidly connected therewith by suitable means such as the threads shown and, adjacent to its outer end, is laterally slotted at 13 to receive a gear 14 corresponding in size and teeth arrangement to the gear 10 of the sun axis stud, this gear being seated within the lateral slot 13 centrally of the arm 12 and secured by means of its collar 14$^a$ and an appropriate set screw to the shaft 15 which journals in opposed bores in the top and bottom of the arm 12 and carries at its upper end a concentric plate 16 rotatable therewith.

The gears 10 and 14 lie in the same plane which is coincident with that of the tunnels 11 and the shaft 15 and axis stud 3 are in substantially parallel planes. The plate 16 which forms in effect an earth support, has a bar 17 fixed thereto and extending upwardly therefrom at an angle of approximately 23½° relative to the plane of the plate and sprocket 12 with its vertical axis in line with the axis of the shaft 15 so that rotation of the shaft and plate 16 will rotate the earth about its vertical axis. The arrangement may be such that the upper end of the bar 17 may represent the North Pole, and the lower end the South Pole.

The aligned gears 10 and 14 are connected by a sprocket type chain 19 extending through the tunnels 11. When the lower sun section 7 with its radial arm 12 and the carried earth are swung about the axis stud 3 representing the axis of the sun, the chain 19 will wrap around one side of the gear 10, and unwrap from the opposite side, the revoluble gear 14 turning responsively during this movement of the radial arm and in turn rotating the earth supporting plate 16, about its axis 15. The gears 10 and 14 being similar, the earth will have one complete rotation about its vertical axis 16 for each complete bodily movement about the axis of the sun, this axial rotation representing not the diural rotation of the earth, but the seasonal relation or succession of seasons as the earth rotates about its axis while coincidently swinging about that of the sun. The base of the sun support 1 may be secured centrally to a zodiac base 21 which as shown in Figs. 1 and 2 may be in the form of a disc or table having the signs of the zodiac arranged annularly thereabout as at 22, with associated monthly divisions as indicated at 23.

Cooperating with the base is an indicator arm 20 rigidly secured to and extending radially from the revoluble sun section 7 at a point diametrically opposite the radial arm 12 carrying the earth. The end of the arm 20 may have an appropriate pointer attached, which pointer, in the arrangement shown, serves to indicate the sign of the zodiac the sun is in as viewed from the earth. As shown in Figure 1, the sun is between the signs "Gemini" and "Cancer" and about to enter "Cancer". Entry of the sun into the sign of "Aries" indicates the beginning of spring, etc.

The revoluble sun section 7 with its attached arm 12 and the earth may be swung about the sun axis by means of the indicator arm 20 or as suggested in Figures 2 and 4, the revoluble section 20 may be provided with an annular groove 24 therein to receive a suitable belt which may be operated by hand or suitable pulleys, etc. to effect the described rotation of the arm 12. Such an arrangement is desirable where the device is mounted in such manner as to render the indicator arm not readily accessible for manipulation.

The device may be used separately from the zodiac base as suggested in Fig. 5 in which a weighted base 25 supports the sun axis stud and a collar 26 forms a permanent part of the lower rotatable sun section 7. The device structurally has the advantage of compactness and accessibility, and its advantage as an educational exhibit will be fully evident from the foregoing description.

What I claim and desire to secure by Letters Patent is:

1. A device of the character described, comprising in combination, a sun formed of a hollow spherical body comprising a stationary substantially semi-spherical section providing a vertical axis pin and a complemental substantially semi-spherical section revoluble on said pin as an axis, a rigid arm extending radially from the revoluble sun section, a gear shaft journalled on said radial arm adjacent its outer end for rotation about an axis parallel with that of the sun, an earth, means to support the earth concentric with said gear shaft for bodily rotation therewith, and gearing operated by a complete rotation of said sun section with its attached radial arm and earth about the axis of said sun section to effect a complete rotation of said gear shaft and a consequent complete revolution of the earth about the axis of said gear shaft.

2. A device of the character described, comprising in combination, a zodiac base, a support thereon, a hollow sectional sun sphere mounted on said support providing a fixed substantially semi-spherical hollow section provided with a fixed axis stud having a gear fixed thereon, and a complemental hollow substantially semi-spherical section inclosing and revoluble on said axis stud, and tunneled for the passage of a motion-transmitting chain therethrough, an arm extending radially from said revoluble sun section, a gear-carrying shaft journalled in said arm adjacent its end for rotation about an axis parallel with the sun axis, an earth mounted on said shaft for revolution therewith about said axis, a chain connecting the sun and earth gears for rotation of the latter by swinging movement of the revoluble sun section and radial arm and an indicator arm projecting from the revoluble sun section in diametrically opposed relation to the earth-carrying arm to overlie and indicate the relative position of earth and sun with reference to the zodiac.

3. A device of the character described comprising in combination, a support, a hollow sectional sun mounted upon a fixed axis stud and including a fixed section and a complemental section revolubly journalled on the axis stud and having spaced chain tunnels therethrough, an arm extending radially from the revoluble sun section and having a shaft journalled therein adjacent its end and mounting an earth for rotation about the shaft axis, similar gears fixed to said axis stud and earth shaft, and an operating chain connecting said gear and extending through said tunnels.

4. A device of the character described, comprising a base supporting a standard, a sectional sun mounted thereon including a hollow section revoluble thereon and having a rigid arm extending radially therefrom, a toothed gear fixed to said standard within said hollow section and in line with said arm, a correspondingly toothed sprocket gear having a shaft journalled on said radial arm adjacent to its end for revolution about an axis in parallel with that of said standard, an earth support mounted on and revoluble with said gear shaft, an earth, means supporting the earth above its said support with its axis alined with that of said shaft, a chain supported by said fixed standard gear and said revoluble earth gear with means for effecting bodily swinging movement of the radial arm and earth about the axis of the sun standard.

Signed at Durham, in the county of Durham and State of N. C., this 1st day of November, 1927.

DAVID PHILLIPS.